United States Patent [19]

Reischl

[11] Patent Number: 4,608,397

[45] Date of Patent: Aug. 26, 1986

[54] FILLER-CONTAINING POLYURETHANE (UREA) COMPOSITIONS PREPARED FROM PREPOLYMERS REACTED WITH WATER IN THE PRESENCE OF LIGNITE OR PEAT

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 672,440

[22] Filed: Nov. 16, 1984

[30] Foreign Application Priority Data

Jan. 26, 1984 [DE] Fed. Rep. of Germany ....... 3402698

[51] Int. Cl.$^4$ ............................................. C08G 18/14
[52] U.S. Cl. .................................... 521/101; 210/679; 435/35; 435/144; 435/174; 435/180; 523/123; 524/705; 524/785; 524/789; 524/791
[58] Field of Search ........................ 521/101; 523/123; 524/705, 785, 789, 791; 210/679; 435/35, 144, 174, 180; 501/402

[56] References Cited

U.S. PATENT DOCUMENTS

| | | | |
|---|---|---|---|
| 3,805,532 | 4/1974 | Kistner | 47/58 |
| 3,812,619 | 5/1974 | Wood et al. | 47/58 |
| 4,329,436 | 5/1982 | Dedolph | 521/101 |
| 4,404,296 | 9/1983 | Schäpel | 523/105 |
| 4,454,044 | 6/1984 | Klein | 210/679 |
| 4,503,150 | 3/1985 | Triolo | 435/174 |

FOREIGN PATENT DOCUMENTS

| | | |
|---|---|---|
| 2347299 | 4/1975 | Fed. Rep. of Germany . |
| 2929872 | 3/1981 | Fed. Rep. of Germany . |
| 1478000 | 6/1977 | United Kingdom . |

OTHER PUBLICATIONS

Tanaka et al., Entrapment of Microbial Cells and Organelles with Hydrophilic Urethane Prepolymers, *European Journal of Applied Microbiology and Biotechnology*, 7, (1979), pp. 351–354.

*Primary Examiner*—Maurice J. Welsh
*Attorney, Agent, or Firm*—Gene Harsh; Joseph C. Gil

[57] ABSTRACT

The invention relates to a process for the production of polyurethane(urea) compositions which contain lignite and/or peat bound in an abrasion-proof manner, which are preferably modified cationically and which have a very high water absorbability. The compositions are produced by reacting isocyanate-terminated prepolymers, which are preferably cationically modified, and which preferably have a functionality of more than 2.1, with more than the stoichiometric quantity of water in the presence of lignite and/or peat and optionally in the presence of organic and/or inorganic fillers and biomasses (living cells, living bacteria or enzymes). The corresponding polyurethane(urea) compositions contain up to 95% by weight of lignite and/or peat in the filler-containing polyurethane(urea) composition and are already swollen from production. The water absorbability (WAF) value thereof when suspended in water is from 33 to 97% by weight of water.

The compositions can be used, in a form optionally containing biomasses incorporated therein, as carriers in microbial synthesis processes for the production of complicated organic compounds, or as carriers for the growth of plants.

31 Claims, No Drawings

FILLER-CONTAINING POLYURETHANE (UREA) COMPOSITIONS PREPARED FROM PREPOLYMERS REACTED WITH WATER IN THE PRESENCE OF LIGNITE OR PEAT

BACKGROUND OF THE INVENTION

Filler-containing polyurethanes which have a high water absorbability are described in German Offenlegungsschrift 3,151,925 as being in the form of abrasive-containing, aqueous polyurethane gels (hydrogels). In that publication, from 20 to 80% by weight of abrasive (such as, for example, aluminum oxide, cerium oxide, tungsten dioxide, boron carbide, silicon carbide, asbestos powder, graphite, glass microspheres, mica or short fibers), and optionally fungicides, dyes or coloring pigments are used, to produce elastic abrasive gels derived from polyurethane(ureas). The compositions are prepared by reacting hydrophilic isocyanate-terminated prepolymers (i.e., those derived from polyoxyalkylene ethers containing 30% or more by weight of oxyethylene groups) with water. The water absorbability of the gels is based on the use of hydrophilic (i.e., oxyethylene group-containing) polyether polyols as the starting materials.

German Offenlegungsschriften 2,347,299 and 2,521,265 describe water-swollen polyurethane(urea) gels which are homogeneous or are blown by $CO_2$ in the manner of a foam, and which may contain up to 50% by volume of fillers (such as silicates, silicas, aluminum oxides, tin oxide, antimony trioxide, titanium dioxide, graphite, graphitic carbon, retort carbon, carbon black, pulverulous types of cement, coloring pigments, fibers and cellulose powder) in addition to surfactants or nutrients. In these publications as well, the water absorbability of the gels is essentially based on the use of hydrophilic polyether polyols which contain 40% by weight or more of oxyethylene sequences.

German Offenlegungsschrift 3,103,499 describes substantially anhydrous polyurethane gel compositions using polyols as the dispersing agent. The gel compositions may contain active substances and dyes, pigments, fibers, inorganic fillers, metal powders, active carbon, cellulose powder and silicas. Polyol-containing gels of this type are unsuitable for use in an aqueous environment, because they release a large amount of the dispersed polyols in aqueous suspension.

It is also known to embed cells which are capable of growth in polyurethane hydrogels, see, for example Tanaka et al, European Journal of Applied Microbiology and Biotechnology, 7, (1979) from page 351. German Offenlegungsschrift 2,929,872 also describes a process for the production of hydrophilic, gel-like or foamed biocatalysts which have a high charge of enzymatically active substance by the polymer inclusion of complete cells, fragments of cells or enzymes, by mixing an aqueous suspension of the enzyme-active substance with hydrophilic polyisocyanates to form an enzyme-active, hydrophilic polyurethane network in block- or bead form. Other publications pertaining to the prior art are noted on page 7 of the Offenlegungsschrift.

In the prior art polyurethane gels, hydrophilic polyurethanes based on polyethers must be synthesized using ethers containing large amounts of oxyethylene segments in order to achieve a satisfactory water absorbability. Problems of reactivity of the hydrophilic polyether polyols (which usually exhibit high activities), and problems in the mechanical gel strength when highly hydrophilic polyether polyols are used often arise. In addition, such compositions are relatively expensive.

DESCRIPTION OF THE INVENTION

It has now been found that it is possible to synthesize filler-containing, abrasion-resistant polyurethane(urea) compositions which have an extremely high water absorbability by using lignite and/or peat as fillers. It is also possible for hydrophilic and/or hydrophobic polyurethane starting components to be used for the formation of the polyurethane(urea). The compositions are formed by reacting isocyanate-terminated prepolymers, lignite and/or peat and a considerable excess of water, preferably by using suspensions of the lignite/peat in water. In this reaction, it is most preferable to use polyurethane reaction components which contain cationic groups or cation-forming groups (for example containing tertiary amino groups), or to add cationic polymers to the reaction mixture. An outstanding wetting of the lignite or peat particles during the reaction is achieved. Additionally, the soluble lignite or peat matter (preferably humic acids) is retained in a most effective manner in the filler-containing compositions so that the carriers of the present invention do not exhibit any bleeding (of, for example, humic acids) in aqueous suspension, as is usually the case in lignite- or peat-containing substances.

According to the present invention, it is possible, although not preferable, to add biomasses during the polyurethane(urea) formation, and thus to bind in living bacteria, active cells, parts of cells or enzymes.

An object of the present invention is to provide highly "hydrophilic" (or water-absorbing) compositions based on polyurethanes which compositions are abrasion-resistant, mechanically resistant, reduced in price as a result of using large amounts of fillers and which are not tied to using highly hydrophilic polyether polyols (containing large amounts of oxyethylene groups) in the preparation thereof.

Thus, the present invention relates to a process for the production of filler-containing polyurethane(urea) compositions comprising reacting (A) at least one di- and/or higher functional isocyanate-terminated prepolymer having an isocyanate group content from 2 to 12% by weight (preferably from 2.5 to 8% by weight), (B) from 0 to 50% by weight based on the weight of component (A) of lower molecular weight di- and/or polyisocyanates, with the further proviso that the combination of (A)+(B) has an isocyanate group content of 30% by weight or less, (C) water, with the quantity of water being in excess of that required to react with all the isocyanate groups of components (A) and (B) and preferably in an amount of at least 2 to about 60 times the weight of (A) and (B), and (D) from 0 to 50 equivalent percent based on the total equivalents of isocyanate groups in components (A) and (B), of an organic di- and/or polyamine, in the presence of (E) lignite and/or peat, preferably lignite powder and/or finely-divided black peat, in quantities of from 0.1 to 95% by weight, preferably from 15 to 95% by weight, and most preferably from more than 50 to 90% by weight, based on the total moisture-free weight of components (A), (B), (D) and (E), and (F) optionally in the presence of inorganic and/or organic fillers and conventional additives, catalysts and auxiliaries known in polyurethane chemistry, to produce filler-containing, polyurethane(urea) compositions which are preferably in pieces and, which when put in an aqueous medium, are abrasion-proof, capable of swelling, and are non-bleeding. The compositions have a water absorbability (WAF value) of from 33 to 97% by weight, and preferably have a content of cationic groups or cation forming groups of from 10 to 3000, more preferably from 30 to 1500 milliequivalents, per 1000 g of components (A), (B) and (D).

The prepolymers used herein are preferably prepared by reacting (a) hydrophilic and/or hydrophobic organic materials which contain two or more hydrogen atoms which react with isocyanate groups and which have molecular weights of from 400 to 10,000, preferably polyhydroxyl compounds, and in particular polyfunctional polyether polyols having a total functionality of 2.1 or more, and most preferably 2.5 or more, the upper limit of functionality preferably being 6, (b) from 0 to 5 moles (preferably from 0 to 2 moles) per mole of (a), of organic materials having molecular weights of from 32 to 399 (preferably from 62 to 254) and which have two and/or more hydrogen atoms which are reactive with isocyanates, preferably di- and/or polyols, and (c) organic di- and/or polyisocyanates, preferably aromatic diisocyanates.

It is also possible to use types of components (a) and/or (b) which contain cationic groups or groups capable of forming cationic groups or to add polymers carrying cationic groups or groups capable of forming cationic groups, (preferably having quaternary ammonium groups or salt-forming tertiary amino groups) to components (a) and/or (b). Optionally compounds containing anion groups in a quantity corresponding to at most the cation equivalent can be used. It is preferred to use compounds containing only cations or cation-forming groups, these groups being built into the polyurethane(urea).

Another object of the present invention is to provide the polyurethane(urea) compositions which may be obtained according to the claimed process, which contain lignite and/or peat and have a high water absorbability, characterized in particular by a lignite and/or peat content of from 0,1 to 95%, preferably of from 15 to 95% by weight, a cationic group or cation group-forming group content of from 30 to 1500, preferably of from 50 to 750 milliequivalents per kg and a water absorbability of from 33 to 97%, preferably of from 50 to 95% by weight.

The lignite and/or peat fillers according to the present invention are thus bound in a polyurethane(urea) matrix which is preferably cation-modified. The filler-containing polyurethane(ureas) are for the most part in a finely-divided or granular form.

The compositions according to the present invention can be used as carriers (which may be readily suspended in water and which optionally contain biomasses incorporated therein) in bio-conversion processes for the production of organic compounds, as carriers (optionally containing plant growth substances, fertilizers or seeds) for plant growth which have a high water binding power, as filtration media or as adsorbents for water-insoluble liquids (for example, crude oil).

The components (E) which are used according to the present invention are peat, for example white or black peat, and lignite. Black peat is preferred of the different types of peat. However, the most suitable filler for the present invention is lignite (in the ground form thereof as so-called lignite dust which generally has a residual moisture content of 60% or less, and preferably from 5 to 20% by weight of water). Due to their powerful water-binding properties, peat and lignite are extremely effective compounds for increasing, in a very efficient manner, the water absorbing properties of polyurethane(urea) carriers, even those which are based on hydrophobic polyurethane starting components. It has been found that the compositions of the present invention, which have a very high water absorbability, exhibit excellent properties due to the mechanical structure of lignite or peat and to their water-binding effect. Lignite dust is the most preferred. It yields excellent results, for example with contents of carbon of about 68%, of hydrogen of 5.3%, oxygen of 25.7% and nitrogen of 1.0% (based on dry substance). Only small quantities of polyurethane(urea) matrix, for example from 5 to 20% by weight are required to synthesize abrasion-resistant, filler-containing polyurethane(urea) compositions. Peat and lignite are capable of binding large quantities of water, without feeling wet: for example $\geq 150\%$ of water, based on lignite or peat dry substance. Even lignite dust from native lignite still contains from about 40 to 60% of water. Very high filler contents (i.e., binding with only a very small quantity of polyurethane(urea) matrix) may be achieved with lignite or peat.

In a particularly preferred embodiment, the filler-containing polyurethane(ureas) contain from about 50 to 95% by weight of lignite and/or peat. Excellent results are achieved with quantities of lignite/peat of from 75 to 90% by weight, based on moisture-free filler-containing compositions. Lignite is most preferably used.

It is possible for other conventional fillers (F) to be added, preferably in minor quantities of less than half the quantities of lignite/peat. These other conventional fillers (F) include, for example, active carbon, powdered charcoal, coal powder, powdered coke, cellulose powder, cork powder, and finely-divided, organic distillation residues which melt at a temperature above 100° C. Preferred residues are distillation residues from the distillation of toluylene diisocyanate which are obtained, for example, by introducing the distillation residues into water, with denaturation, and subsequent crushing. These TDI residues may optionally also be subsequently modified by a treatment with compounds carrying reactive hydrogens, such as ammonia, polyols or polyamino compounds. In many cases, the residues still contain small quantities of isocyanate groups or reactive conversion products of isocyanates. Distillation residues of this type are described in, for example German Offenlegungsschriften 2,846,814; 2,846,809 and 2,846,815. Other suitable distillation residues include high-melting distillation residues of amines, phenols and caprolactam and the like.

Inorganic fillers, such as quartz, beach sand, pyrogenic silica (Aerosil), silicates, alumosilicates, bentonites, aluminum oxide, pumice stone, diatomite, silica sols, water glass, calcium oxide, calcium carbonate, barite, gypsum, and finely divided (iron-II-and/or -III-) iron oxides in pigment form or as magnetites are preferably used only in proportions to allow a certain control of the surface activity and the specific gravity of the compositions so that they sink or are suspended in water (under no circumstances should the composition float on the surface).

Fibers (for example, inorganic fibers) such as glass fibers or natural or synthetic fibers (for example, cotton dust) may also be used as modifying filler additives.

The grain size of the fillers (F) and the lignite/peat (E) is generally from 0.5 to 1,000 $\mu$m, preferably below 300 $\mu$m and more preferably below 100 $\mu$m. Smaller grain sizes are preferred in particular for active carbon and inorganic and for coal powder or powdered charcoal, compared to the peat or lignite dust because peat and lignite may also contain quantities of natural fibers.

The total amount of filler (F) and lignite/peat (E) should be from about 15% by weight, preferably 20% or more by weight, and more preferably 40% or more by weight, to an upper limit of 95% or less by weight, preferably 90% or less by weight. The quantities are calculated in % by weight, based on the moisture-free content of the filled polyurethane(urea) compositions. The upper limit is generally determined by consistency and the abrasion resistance of the highly-filled polyurethane(urea) compositions.

The fillers (F) and lignite/peat (E) are introduced during the formation of the polyurethane(urea) matrix in different ways. Thus, they may be mixed with one of the starting substances. For example, they can be added to the isocyanate-terminated prepolymers or to the active-hydrogen containing materials used to make the prepolymer and then the polyurethane(urea)forming reaction may be carried out. However, the fillers (F) and lignite/peat (E) are preferably first wetted, or made into a paste with water or dispersed in water. Then the prepolymers are added thereto. The fillers (F) and lignite/peat are surrounded and are bonded therewith. The polyurethane(urea) synthesis takes place at the same time.

(A) NCO prepolymers

The starting components for the prepolymers are known for use as polyurethane-forming starting components. They include the materials described below. (a) The starting materials for preparing the prepolymers include organic materials having two or more hydrogen atoms reactive with isocyanate groups and having molecular weights of from 400 to 12,000. Preferred are di- and/or higher functional higher molecular weight polyols preferably having functionalities of 2.1 or more, preferably 2.5 or more (and up to about 5, preferably no higher than 3.5). These higher molecular weight polyhydroxyl compounds have molecular weights of from 400 to 12,000, preferably from 800 to 8,000. Polyethers are preferred over polyesters, polycarbonates or polylactones because polyethers are substantially more stable to hydrolysis, even over a long period of time compared to polyhydroxyl compounds containing ester groups.

Those polyoxyalkylene ethers, which are suitable for the synthesis of hydrophilic polyurethanes, contain a relatively large amount, for example more than 20% (or more than 30%, or even more than 40%) by weight, but less than 85% by weight, of oxyethylene sequences. The oxyethylene groups may be incorporated into the polyethers in the terminal position, in a random distribution or preferably, in a segment-like fashion. The polyoxyalkylene ethers may also contain small quantities of, for example, cycloaliphatic or aromatic groups. These can be produced by using initiators such as cycloaliphatic polyols or aromatic compounds (for example, dihydroxycyclohexanes or hydroquinone-bishydroxyethylethers or 4,4'-dihydroxy-diphenyl-dimethyl methane). Suitable polyols may also be synthesized by alkoxylation of higher functional alcohols, or sugars. Polyethers with 30% or less oxyethylene groups are preferred.

Hydrophobic polyethers may surprisingly also be used to make the prepolymer. Such hydrophobic polyethers are even the preferred polyethers (for example, polyoxypropylene polyols with or without small quantities (for example <20% by weight) of incorporated oxyethylene segments, which by itself does not yield a hydrophilic polyurethane(urea) matrix). Surprisingly, carrier systems synthesized from such polyethers and lignite and/or peat, exhibit high water absorbability values (WAF) and generally even have an improved long-term resistance in aqueous bioconversion media. On the other hand, if fillers such as coal dust, carbon black or active carbon are used without lignite or peat, filled polyurethane(ureas) are obtained which exhibit significantly lower water absorbability since such surface active coals cannot cause high absorbability by themselves. Polyethers based on propylene oxide adducts are the polyethers which are preferred according to the present invention. However, the polyethers can also be produced based on other alkylene oxides, such as, for example epichlorohydrin, epoxy butanes or mixtures with, for example, propylene oxide. Hydrophobic polypropylene glycols have proved to be particularly favorable according to the present invention.

Polyether amines having terminal amino groups (for example polyethers which have terminal aliphatic amino groups and which may be obtained by pressure amination of the secondary hydroxyl groups or by cyanethylation and subsequent reduction), or aliphatic and preferably aromatic polyetheramines which are produced by alkali hydrolysis of isocyanate terminated prepolymers are also useful.

The relatively high molecular weight compounds (a) may also contain up to 40% by weight of relatively high molecular weight polyaddition products (for example the reaction product of hydrazine hydrate and toluylene diisocyanate). Also useful are the so-called polymer polyols, i.e., those that contain up to 40% by weight of copolymers or graft (co)polymers based on acrylonitrile and (meth)acrylic ester.

(b) Also useful in preparing the prepolymers are low molecular weight, di- and/or higher valent compounds having molecular weights of from 32 to 399, preferably from 62 to 254. Preferred are di- and/or polyols or amino alcohols such as, for example ethylene glycol; 1,2-propylene glycol; 1,4-butanediol; 2,3-butanediol; neopentylglycol; 2-methyl-propanediol-1,3; hexanediol-1,6; dodecanediol-1,12; the relatively hydrophilic di-, tri-, tetra- and polyethylene glycols having molecular weights of up to 399; di-, tri- and tetrapropylene glycols; or di-, tri- and tetraoxymethylenediols. Bis-hydroxyethyl-amine, bis-2-hydroxypropylamine, amino sugar or 2-amino-propanediol-1,3 may be used as amino alcohols.

The quantity of (b) used is from zero to about 5 moles of (b) per mole of (a). Trifunctional polyols (b) may be incorporated to control the total functionality of the NCO prepolymers.

It is particularly preferred to simultaneously use cationic groups, or cation group-forming groups in the polyurethane during the synthesis. Quaternary ammonium groups, amino groups, sulphonium or phosphonium groups can be used as cationic groups. It is preferable to use compounds which contain quaternary ammonium groups or tertiary amino groups, the latter being subsequently converted into the ammonium or salt form. The quantity of cationic groups or cation-forming groups to be incorporated is preferably from 10 to 3,000 milliequivalents of cations or cation forming groups per 1000 grams of components (A), (B) and (D). When compounds are used which are already quaternized or have been converted into the salt form, the upper limit is generally 2000 milliequivalents per 1000 g because otherwise the viscosity would be too high during the reaction. From 30 to 1500 milliequivalents of cationic or cation-forming groups are preferably incorporated, and from 50 to 750 milliequivalents of cationic or cation-forming groups per 1000 grams are most preferred.

The following are preferably used as cation-forming compounds: diols or polyols containing tertiary amino groups, such as, for example, N-methyl-di(ethanol) amine or -(propanol) amine; N,N-dimethylaminomethyl-propanediol-1,3: bis-hydroxyethylpiperazine; higher functional compounds, such as, for example, triethanol amine; or relatively high molecular weight compounds, such as polyoxyalkylene ethers which are started on tertiary amino polyols. Hydroxy-functional, quaternized compounds may also be used including, for example, tetrahydroxyalkyl-ammonium chlorides or -ammonium methyl sulphonates. It is sometimes sufficient to use compounds which provide terminal tertiary amino groups, such as, N,N-dimethylaminoethanol.

Surprisingly, when such cationically modified polyurethanes (or other cationically modified high polymers are added) are used, the components of lignite or peat which are otherwise water-soluble, namely the humic acids and similar acidic, soluble compounds are fixed in a quantitative manner. Thus, a colorless, completely clear aqueous phase is obtained when large quantities of peat and/or lignite are used. Hitherto, the use of peat or lignite in aqueous systems has been hindered by the serious disadvantage that these cheap natural substances turn the water brown or cloudy in color due to the release of considerable quantities of a large number of constituents which are directly soluble in water at a pH of from 5 to 9, or which dissolve in a colloidal manner, for example humic acids or precursors thereof.

For the production of cationic or cation-forming polyurethane(urea) compositions, a preferred method is one which uses isocyanate-terminated prepolymers which contain cationic groups incorporated therein, or have a group capable of cation formation, such as tertiary bound nitrogen. Conventional acids may be added to form the salt, for example hydrochloric acid, phosphoric acid or sulphuric acid. However, in some cases it is even sufficient to form the salts with the humic acids.

Cationic polymers of a different type (for example aqueous polyurethane or polyacrylate or polyamide dispersions) may also be added to the reaction mixture. They may be used as replacement for or in addition to incorporated or incorporable cationic components. When cationic dispersions are added, it is generally only possible for relatively small quantities to be completely absorbed in highly-filled polyurethane(urea) compositions. When too great a quantity of dispersion is added, some of the dispersion is washed out in the water. It is possible, but less preferred, to subsequently add aqueous, cationic dispersions to the non-ionic, highly-filled polyurethane(urea) carrier material. In this form, the cationic dispersion is not fixed and often acts as a flocculating agent for substances in the bio-conversion processes. On the other hand, it is substantially more advantageous to admix these cation-active polymers before the isocyanate reactions in aqueous phase [for example, before the reaction of the isocyanate prepolymer with water to produce the polyurethane(urea)]. Aqueous cationic polyurethane dispersions are preferred over other cationic high polymers. The addition of cationic polymers is not generally preferred and sometimes shows technical disadvantages.

In addition to the cation groups, anion groups (for example sulphonate groups) may also be present in the polymer or they may be present as (polymeric) additives with the formation of ampholyte systems, up to, or preferably below the cation equivalence. An excess of anions above the cation groups should be avoided.

The cation groups in the highly-filled polyurethane(urea) compositions have a favorable influence not only on the binding of the peat or lignite but also on the abrasion resistance of any additional fillers. Moreover, the ion charges ensure a finely-dispersed distribution (or even solution) of the isocyanate compounds in the quantities of water used (a type of emulsifier effect), so that an undesirable coagulation of the polyurethanes does not occur. Rather, the fillers (F) and lignite peat are surrounded very regularly by the polyurethane(urea) being formed.

Surprisingly, it has also been found that inorganic fillers, such as quartz, beach sand or pumice stone powder are bound by the cationic polyurethanes to a much greater extent and in an abrasion-resistant manner. No sedimentation phenomena of the inorganic fillers occur during the polyurethane(urea) formation. Inorganic fillers are generally added in order to regulate the specific gravity of the compositions so that the compositions do not float during the biological conversion processes in aqueous solutions. Extremely finely-divided inorganic fillers (from 0 1 to 10 $\mu$m) also increase the specific surface area of the compositions. Iron oxides exert a favorable influence of the transfer of oxygen. The inorganic fillers are generally used only in modifying quantities, in addition to lignite and/or peat.

(c) Also necessary in the production of the prepolymers are organic di- and/or polyisocyanates. Examples include hexane diisocyanate: dicyclohexylmethane diisocyanate; isophorone diisocyanate; and the like. Preferred are aromatic di- and polyisocyanates, such as toluylene diisocyanate and the isomer mixtures thereof: diphenyl methane-4,4'- and/or 2,4'- and/or 2,2'-isomers; and, optionally the relatively high molecular weight polyphenyl polymethylene polyisocyanates, of the type produced by phosgenation of crude formaldehyde/aniline condensation products (polyamine mixtures), which can be used as undistilled sump products. Polyisocyanates which contain sulphone groups may also be used.

However, substantially any di- and/or polyisocyanate may be used. Suitable polyisocyanates are mentioned in detail in, for example, German Offenlegungsschrift 2,832,253. Examples of the various components are also described therein.

The reactive components are reacted with excess quantities of di- and/or polyisocyanates to form isocyanate terminated prepolymers (A) having NCO group contents of from 2 to 12% by weight of NCO, preferably from 2.5 to 8% by weight and most preferably from 2.5 to 6% by weight. The reaction is conducted in a conventional manner, for example by heating the components together at a temperature of from 50 to 100° C. until the prepolymers are formed.

The total functionality of the isocyanate terminated prepolymers (A) should preferably amount to at least 2.1, preferably at least 2.5. In other words, at least one of the components used to make the prepolymer must be more than difunctional.

(B) The prepolymers (A) may be mixed with further quantities of low molecular weight di- and/or polyisocyanates (B) in quantities up to 50% by weight of (A), and until mixtures of (A)+(B) are formed having NCO group contents of 30% by weight or less, and preferably 20% by weight or less. A different isocyanate may be used for the prepolymer formation. When the same polyisocyanates are used, a correspondingly large proportion of polyisocyanates may be used during the prepolymer formation (A).

When mixtures having a high NCO content are used, polyether polyols or polyether-polyurethane preadducts containing terminal OH groups may be added during the production of the highly-filled polyurethane(ureas) in such quantities, that the resultant reaction product will have an NCO-group content of from 2 to 12% by weight.

(C) The prepolymers (A) or the mixture of (A) and (B) are reacted with quantities of water in excess of that required to react with all the isocyanate groups and preferably in an amount far exceeding the stoichiometric quantity. The quantity of water is preferably used to make paste or dispersions of the fillers (F) and lignite/peat (E). The NCO prepolymers are then admixed. Such prepolymers may be dispersed in proportionate quantities of water. The prepolymers generally thoroughly wet and surround the fillers and lignite/peat then harden with water relatively slowly (faster when quantities of di- or polyamines are added) to produce the polyurethane(urea) matrix. The water reaction may be shortened to a few minutes as a result of raising the reaction temperature.

Any types of substances which are conventional in polyurethane chemistry may be used as additives and/or auxiliaries. Such substances include, for example, stabilizers, UV absorbers, dispersing agents, emulsifiers, silicone derivatives, dyes and pigments. The conventional polyurethane catalysts, such as tertiary amines, metal catalysts or tin catalysts may be used as catalysts, but this is not absolutely necessary in many cases.

It is also possible to include in the reaction mixture (D) organic di- and/or polyamines. Such amines are used in an amount ranging from 0 to 50 equivalent percent based on the total isocyanate equivalents in components (A) and (B). When such amines are used, very rapid partial solidification takes place. Examples are ethylenediamine, diethylene triamine hexamethylene diamine, 4,4'-diaminodiphenylmethane 3,3'-dimethyl-diphenyl-methane-4,4'-diamine, diethyltoluenediamine (stereoisomers ) or mixtures, or polyether polyamines with molecular weights up to 3000.

When strongly hydrophilic prepolymers are used, the polyurethane(urea) carriers containing lignite and/or peat are present in a more or less gel-like swollen form (which may be foam-like) which feels moist. On the other hand, carrier compositions which are produced according to the present invention based on hydrophobic prepolymers feel dry and thus are clearly different from the gel-like products. They exhibit a good abrasion resistance and surprisingly high water absorbability (WAF). Moreover, unlike gels, they are directly produced in a small-lumped, directly usable form. Carriers on the basis of hydrophobic prepolymers are therefore preferred. In some cases it is also very advantageous to use a mixture of hydrophilic and hydrophobic prepolymers, particularly in order to produce a lump form product. The products of the invention may also be produced by processes and from starting components of the type described in, for example DE-OS 2,347,299; DE-PS 2,521,277; DE-PS 2,521,265; DE-OS 3,103,500 DE-OS 3,103,564 and DE-OS 3,151,925 (where DE-OS represents a German Offenlegungsschrift and DE-PS represents a German patent).

A preferred method of producing the polyurethane(urea) composition is by using NCO prepolymers (A), which are produced from excess quantities of isocyanates and hydrophobic and/or hydrophilic polyhydroxyl- or polyamine compounds (preferably polypropylene ether polyols containing ethylene oxide groups), chain lengthening agents, and compounds containing cationic groups or cationic group-forming groups. As a result of the reaction of the isocyanate groups with the excess quantities of water and with any amine groups present, the reaction takes place to produce the polyurethane(urea).

The suspending or wetting operation of the fillers (F) and lignite/peat (E) preferably is carried out first in the excess aqueous phase, and the prepolymer is then metered in.

In suitable, continuously operating mixing units, such as a double blade screw trough, all the components may be added substantially simultaneously or within only a few seconds of each other and can be mixed intensively causing the isocyanate reactions to commence immediately. It is possible to influence the rate of the reaction by using catalysts and/or by using elevated temperatures. At the start of the isocyanate reaction, a temperature of from 10° to 90° C., and preferably from 20° to 70° C., is selected. In many cases, normal room temperature is suitable. Once the fillers (F) and lignite/peat (E) have been completely wetted, the reaction temperature may be raised to about 90° C. if desired.

As already mentioned above, water is not only necessary as a reaction component for the polyisocyanate compounds, but it also serves as a dispersing agent in relatively large excess quantities, regardless of whether hydrophilic or hydrophobic isocyanate compounds are used.

The resultant product has a high water absorbability, a high water retention capability, good abrasion resistance, good stability and insolubility in aqueous systems, and a tendency to sink or at least an ability to be suspended in aqueous phase (i.e., a non-floating characteristic).

A maximum hydrophilic nature can be achieved by using components which are predominantly strongly hydrophilic. However, polyurethane(ureas) which are too strongly hydrophilic, are for the most part not sufficiently abrasion-proof in fluidized beds and are not sufficiently stable with respect to long-time storage in water.

The water absorbability of the compositions of the present invention can be achieved in various ways. As a general rule, a substantial part of the water absorbability (WAF value) is affected by the lignite and/or peat. The polyurethane(urea) pre-products are preferably used in as small a quantity as possible and with as high a binding power as possible.

The quantity of water which is present during the reaction with the NCO prepolymers and fillers (F) and lignite/peat (E) is also extremely significant. When relatively small quantities of water excess are used, for example 20 parts of water per 80 parts of hydrophobic NCO prepolymer plus fillers (F) and lignite/peat (E), there is produced a finely-powdered or friable product which has a high wash-out rate. Only with a considerably higher quantity of water does the hydrophobic NCO prepolymer bind the fillers and lignite/peat to produce an abrasion-proof composition which is capable of absorbing water and which has the properties required according to the present invention. The NCO prepolymer (in particular, one with high cationic modification) surrounds the filler and lignite/peat particles in a wetting manner and then reacts to produce the polyurethane(urea), thereby enclosing the particles in a tight, but water-permeable manner.

The proper amount of water for any combination of reactants can generally be determined by conducting small scale experiments. Thus, preliminary samples, of about 30 to 300 g in size, of the highly-filled polyurethane(urea) compositions are produced systematically by varying the type and quantity of the isocyanate components and the fillers in the presence of variable, but always large excess quantities of water. Those samples are subjected to a test in water-filled columns (for example having a diameter of from 10 to 20 cm) through which air is allowed to pass from below through a frit or a finely-perforated sieve plate. Within 24 hours, it is possible to easily determine the abrasion, the sinking tendency, the color and the transparency of the aqueous phase. The presence and correct metering of excess quantities of water is, as explained above, extremely significant during the production of carrier materials for use as bio-activators in biological conversion processes.

The shaping process of the highly-filled polyurethane(ureas) is determined by the respective process technology of the proposed use. Regular or irregular lumps of granulated material can be obtained using conventional cutting or granulation techniques thereby forming block-, strand- or ribbon-shaped products. In some cases, the highly-filled polyurethane(ureas) can be employed in the form of films which are suspended or wound as spirals in the bioreactors. In these cases, textile backings may be used to stabilize particularly large surfaces.

In the cheapest and simplest embodiment, the carriers are used in the form of an irregular granulate in a size of from 0.1 to 10 cm, preferably from 0.5 to 5 cm. For this purpose, the substantially or completely reacted, highly-filled polyurethane(ureas), which may be in a strand, block or ribbon form, are crushed to a suitable piece size by means of conventional choppers or cutting granulators. Extremely fine grains which may be produced may optionally be isolated and separated during the washing procedure.

If the isocyanate reactions are carried out in kneaders or in mixing apparatus which are fitted with tools similar to plough blades or paddles, a subsequent crushing operation is generally not necessary.

The water-swollen carrier compositions of the present invention are generally soft-elastic, abrasion-proof particles, which feel moist, which can be suspended in water and which slowly sink therein.

It could not have been foreseen that the polyurethane(urea) compositions, highly filled with lignite or peat, could be produced in a sufficiently abrasion-proof manner, and could exert such a favorable influence on the bio-conversions, even though the black peat and lignite are embedded inside the polyurethane(urea) composition.

The carriers used according to the present invention are suitable for many of the conventional bio-conversion processes, for example for the production of citric acid from starch, for the hydrolysis of Penicillin G by means of acylases to produce 6-aminopenicillic acid, for the production of stereo-specific biologically active compounds, or for the fermentation of sugar-containing waters in the sugar beet industry.

The filler (F) and lignite/peat (E) which is incorporated in the polyurethane(urea) has an advantageous influence on the improved bio-conversion process in many respects. Depending on the type of filler and type of polyurethane(urea) matrix, the mechanical strength and the water absorbing and retaining properties of the polyurethane(urea) are improved. The bio-active assimilation capacity of the dissolved organic substances to be converted is substantially increased. Moreover, the filler or filler mixture bound in the polyurethane(urea) acts simultaneously as a control for maintaining optimum, specific gravities so that a uniform distribution of the carriers having a slight sinking tendency or the maintenance of a suspended condition is possible in conventional containers. For most processes, this is particularly significant and may even be a prerequisite.

The degree of the water absorbability of the highly-filled polyurethane(urea) compositions is preferably adjusted so that a high water absorption takes place over a period of hours or a few days, with considerable swelling, or so that there is a relatively large quantity of water present as the disperse phase even during the production of the polyurethane(urea) compositions and the carriers are thus already completely swollen.

The "in situ" incorporation of microorganisms in polyurethanes or other plastics is not possible without substantial losses of reproductive bacteria and a considerable reduction in the bioactivity, even under very careful and technically expensive conditions is observed. The production conditions must be controlled in particular with respect to the temperature. Nevertheless, this process is not preferred, and is generally not even necessary, because biomasses grow very effectively in the polyurethane(urea) carrier compositions containing the lignite or peat.

The use of the polyurethane(urea) carrier compositions containing lignite and/or peat according to the present invention lies in their higher water absorbing property. It is possible to use these compositions as soil conditioners or hydrophilic, readily rooting special growth carriers for plants since they can contain plant nutrients, they have a high water content and can contain a fertilizer.

Seeds may also be added to the compositions during production. These seeds are then brought to germination and may be used in, for example, plate molds as, for example parsley grass, or used in small pieces for plant layering.

Another important use of the compositions is as carriers for bacteria or enzymes in bio-conversion processes for the production of complicated, organic compounds. The carriers which are in lumped form may be easily drawn off by filtration from the reaction or fermentation vapors.

The invention is further illustrated, but is not intended to be limited by the following examples in which all parts and percentages are by weight unless otherwise specified.

EXAMPLES (A) General method of producing the carrier compositions (A)1. Production of the NCO prepolymers The NCO prepolymers are produced in a known manner in a mixing apparatus by heating the starting components noted in Table 1 for about 2 to 3 hours at a temperature of from about 70° to 90° C., until the calculated NCO content is attained. See Table 1 for the composition.

TABLE 1

| | Composition and characterization of the NCO prepolymers (PP) for Examples 1-8 | | | | | | | |
|---|---|---|---|---|---|---|---|---|
| Type | Viscosity mPas/25° C. | % NCO | Isocyanate Quantity/Type | | Polyetherpolyol Quantity/Type | | NM | DMS | IQU |
| KI-PP-A | 12,500 | 5.1 | 16.6 | TDI | 80.4 | PHILV | 1.5 | 1.5 | 120 |
| KIO-PP-B | 6,400 | 5.3 | 19.1 | TDI | 57.1 | PHILV | 2.4 | 2.4 | 200 |
| | | | | | 19.0 | PHOBL | | | |
| KO-PP-C | 9,500 | 5.9 | 20.0 | TDI | 41.9 | PHOBV | 1.5 | 1.5 | 120 |
| | | | | | 35.0 | PHOBL | | | |
| O-PP-D | 7,800 | 3.3 | 11.9 | TDI | 88.1 | PHOBV | — | — | — |

Type = characterization of the NCO prepolymers (PP) (the last letter, i.e. A through D is only used for designation purposes).
K = Cationic
I = Hydrophilic
O = Hydrophobic The quantities stated in Table 1 are in parts by weight.
The materials used were as follows:
Isocyanates used:
TDI=Toluylene diisocyanate-2,4-, -2,6-isomer mixture (80:20 wt ratio)
D 44 R=Distillation residue from the production of 4,4'-diphenylmethane diisocyanate, containing quantities of relatively high molecular weight polyphenyl-polymethylene-polyisocyanates, NCO content 29.8% by weight.
Polyether polyols:
PHILV=Hydrophilic, branched polyether from trimethylol propane reacted with 40 parts of propylene oxide and 60 parts of ethylene oxide, OH no. 26.
PHOBV=Hydrophobic, branched polyether from trimethylol propane reacted with 80 parts of propylene oxide and then with 20 parts of ethylene oxide, OH no. 28.
PHOBL=Hydrophobic, linear polyether of 1,4-butanediol and propylene oxide, OH no. 56.
Compounds having tertiary nitrogen:
NM=N-methyl-diethanol amine
Quaternizing agent:
DMS=Dimethyl sulphate
PPS=85% polyphosphoric acid
Ionification details:
IQU=Cation equivalent or tertiary nitrogen equivalent (cation conforming group) in milliequivalents per 1000 g of NCO prepolymer.

(A) 2. Reaction of the NCO prepolymers to produce the compositions corresponding to Examples 1 to 8 (general instructions)

The lignite/peat and any filler is suspended in and/or wetted in the specified quantity of water. The NCO prepolymer is introduced by stirring rapidly and intensively at room temperature. In the case of strongly hydrophilic prepolymers, the reaction mixture solidifies at room temperature even after a few minutes (for example after 1 to 3 minutes). In the case of hydrophobic prepolymers, the mixture does not solidify until after 1 to 2 hours. The reaction time can be shortened to a few minutes by adding from 0.1 to 0.5% by weight of catalyst, based on the quantity of prepolymer and/or by using hot water (about 80° C). If the cations are not built in or have not yet formed in the prepolymer (For example by quarternization of tertiary amino groups built into the NCO-prepolymers), the calculated quantity of acids (phosphoric acid is preferred) is added to the aqueous suspension to form the amine salt. When lignite or peat is used, the humic acids contained therein can be used to form the salt, with the formation of polyurethane humates.

The carrier compositions according to the present invention which have been produced in this manner sediment completely in water at different rates depending on their composition.

EXAMPLE 1

Carrier material 67.7 parts by weight of a native lignite from the Aachen lignite country containing 52% of residual moisture which had been crushed into particles of below 200 μm are stirred into 35.2 parts by weight of water, and then stirred with 7.5 parts by weight of the cationic NCO prepolymer KI-PP-A (5.1% by weight of NCO) according to the general production process stated above. A carrier material is produced in the form of a water-swollen, slightly elastic, solid material which feels moist and is granulated into pieces smaller than 12 mm. The solid, lignite-filled cationic polyurethane-(urea) carrier material contains 32.5 g of lignite dry substance in 40 g of anhydrous carrier composition (from calculated anhydrous lignite and assumed anhydrous prepolymers), and consequently contains 81.25% by weight of lignite, based on the dry mass of the filled polyurethane(urea) composition.

The resulting granulated carrier material is then mixed with excess water, completely swollen for about 24 hours (at room temperature) and the water which is left over is decanted off. The value derived therefrom which indicates the percent by weight of water in and between the swollen carrier (filler-containing polyurethane urea) is designated herein as water absorbability (WAF).

The solids content of the aqueous suspension of the granulated material, produced in this manner, in the form of a now greatly swollen carrier material is, in the Example, 140 g of solids per liter of suspension (without supernatant or overlying water). The solids content in one liter of such a suspension (without supernatant water) is designated the dry substance of the suspension (abbreviated to TS-S).

The weight of one liter of the suspension of the greatly swollen carrier material (without supernatant water) is termed the suspension weight (abbreviated to SG).

The value of the so-called suspension factor (F4) is derived from the suspension weight (SG) and the dry substance of the suspension (TS-S) contained therein. The value of the suspension factor F4 minus 1 (F4-1) gives the quantity of water (based on dry substance) in the suspension (in the form of swelling water and as water in the cavities in or between the carrier particles).

The value of the suspension factor F4 is determined in practice by first determining the dry substance of the suspension. The suspension (SG) is then divided by the dry substance (TS-S) contained therein:

$$F4 = \frac{SG}{TS - S}$$

From this suspension factor F4, it is possible to determine the water absorbability (WAF) according to the following formula as a characteristic of the compositions of the present invention:

$$WAF = \frac{F4 \text{ minus } 1}{F4} \cdot 100; \text{ (in \%)}.$$

The value of the water absorbability (WAF), expressed in percent, provides a concrete picture of the condition of the highly-swollen carrier compositions as they are used in a swollen condition in an aqueous suspension. For example, in Example 1, the dry substance of the suspension amounts to 140 g of solids. With a suspension weight of 1013 g per liter, it is possible to calculate the suspension factor $$F4 = \frac{1013}{140} = 7 \cdot 236.$$

Thus, one part by weight of dry substance of the carrier composition is converted with 6.236 times the amount of water into the swollen suspension form described above. In other words, the water absorbability value is 6.236 divided by 7.236 multiplied by 100 = 86.2%.

To further characterize the compositions, the apparent densities (in g/l) are determined after different types of treatment under the following conditions:

S1. Apparent density, drained off: The composition is suspended in a large excess quantity of water for 24 hours. A sieve having holes of 2 mm is then filled to a height of 10 cm with this swollen composition and is left to drain for 1 hour. The amount of composition remaining in the sieve is then weighed in a measuring vessel and converted into the apparent weight per liter.

S2. Apparent density, crushed out: The carrier drained according to S1 is subjected to a pressure of 3 bars in a 1 mm sieve for 5 minutes, and then weighed in a measuring vessel. After converting to one liter, the apparent density, S2, is determined.

S3. Apparent density, dried: The moist, crushed out composition is dried for about 1 day at 110° C. under vacuum until the weight is constant. The sample is weighed in a measuring vessel as described above and the apparent density calculated.

In the Example given above, the values of S1 to S3 determined in this manner are as follows:
S1 (drained off) 515 g/l
S2 (crushed out) 503 g/l
S3 (dried) 239 g/l.

The following factors can also be determined for a better comparison:

F1: The volume factor is the quotient of the apparent density, drained off (S1) and the weight of dry substances of one liter of the suspension (TS-S).

$$F1 = \frac{S1}{TS - S}. \text{ In Example 1, } F1 = \frac{515}{140} = 3.7.$$

F2: The crush factor corresponds to the quotient of the apparent density, crushed out (S2) and the dry weight of the substance of one liter of the suspension (TS-S).

$$F2 = \frac{S2}{TS - S}. \text{ In Example 1, } F2 = \frac{503}{140} = 3.6$$

F3: The swelling factor is the quotient of the apparent density, drained off (S1) and the density of the dry mass determined after completely removing the water from one liter of the drained sample (TS-S1)

$$F3 = \frac{S1}{TS - S1}. \text{ In Example 1, } F3 = \frac{515}{156} = 3.3$$

The volume, crush and swelling factors should be at least 2, preferably at least 3 and more preferably at least 4. The upper limits of the above-mentioned factors are slightly below 20, and preferably below 15. Moreover, the three factors of the same sample should differ as little as possible from each other, i.e., only by three times and preferably only by two times.

EXAMPLE 2

2.1 Carrier material:

Lignite-filled, ampholytic (containing cations and anions) polyurethane(urea) composition produced according to the production method from
(i) 41.66 parts by weight of native lignite containing 52% of residual moisture (20.0 parts by weight of dry substance of lignite), crushed to a size of less than 200 μm,
(ii) 10.0 parts by weight of cationic NCO prepolymer KI-PP-A, and
(iii) 70.0 parts by weight of water in which 0.2 parts by weight of diamino-sulphonate corresponding

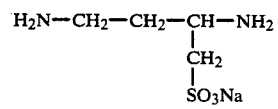

are dissolved.

The carrier material contains about 66.6% by weight of lignite. There is a slight cation excess.

The granulated material was crushed into piece sizes of below 12 mm. The TS-S value is 112 g/l of suspension.

The apparent densities (g/l) are as follows:

| | |
|---|---|
| Drained off: | 645 g/l (S1) |
| Crushed out: | 505 g/l (S2) |
| Dried: | 349 g/l (S3). |

Values of the water absorbability (WAF) and the percent solids content (percent FKS), and all the values F1 to F4) for Examples 1 through 8 are set forth in Table 2.

EXAMPLE 3

Carrier material of cationic polyurethane(urea) with 33.3% by weight of beach sand and 33% by weight of lignite dust (based on dry substance)

According to the general process, a cationic polyurethane(urea) is produced from isocyanate prepolymer KI-PP-A and beach sand (fineness less than 300 μm), using 10 parts by weight of cationic NCO prepolymer KI-PP-A, 70 parts by weight of water, 10 parts by weight of beach sand and 11.25 parts by weight of lignite dust having a residual moisture content of 11% (=10.0 g of lignite dust without moisture). The resulting granulated material is crushed to a size of less than 12 mm. The TS-S value is 84.5 g/l of suspension, the apparent densities S1): 645 g/l (drained off); S2): 566 g/l (crushed out): S3): 302 g/l (dried).

EXAMPLE 4 - Comparative experiment to Examples 1 to 3 (not according to the present invention)

4.1 Carrier material: (Comparison)

A cationic polyurethane(urea) is produced from isocyanate prepolymer KI-PP-A, but without filler (15 parts of NCO prepolymer KI-PP-A and 85 parts of water). The resulting granulated material is used once it has been crushed to a size of less than 12 mm.

4.2 Use as carrier material for intended biological conversion processes:

The substance according to Example 4 (Comparison) had to be used in a stirrer-equipped apparatus, because this carrier material floated even after weeks in a fixed bed apparatus. This material is quite unusable in a fluidized bed apparatus.

The TS-S value of the granulated material of Example 4 is 36 g/l. The apparent densities: S1: 520 g/l (drained off); S2: 490 g/l (crushed out) and S3: 219 g/l (dried).

EXAMPLE 5

5. Carrier material:

Cationic polyurethane(urea) composition, filled with 50% by weight of lignite dust and 25% by weight (based on dry substance) of black peat.

According to the production method above, 22.47 parts by weight of a lignite with an 11% residual moisture content (corresponding to 20 parts by weight of lignite dry substance) in crushed form (below 100 μm) and 12.35 parts by weight of black peat with a 19% residual moisture content (corresponding to 10 parts by weight of black peat dry substance) and having a fiber proportion of 80% by weight, crushed to a size below 200 μm, are reacted with 10 parts by weight of a mixture of the cationic prepolymer KIO-PP-B and the non-ionic NCO prepolymer O-PP-D in a weight ratio of 3:2 (the mixture of prepolymers containing 4.5% by weight of NCO groups), and 55.3 parts by weight of water. The resulting highly-filled polyurethane(urea) carrier is crushed into a granulated material having pieces of less than 20 mm in size. When suspended in water, the TS-S is 108 g/l, and the apparent densities are as follows:

| | |
|---|---|
| Drained off: | 586 g/l, (S1) |
| Crushed out: | 412 g/l, (S2) |
| Dried: | 158 g/l, (S3). |

When the lignite dust containing 11% residual moisture are replaced by a corresponding quantity of completely dried lignite dust (less than 1% by weight of water), virtually the same results are achieved when used in bioconversion processes. Therefore, it is not necessary in practice to proceed with a drying process for the lignite dust. Moreover, the re-swelling and wetting of completely dried lignite dust is both time consuming and complicated.

EXAMPLE 6

Cationic polyurethane(urea) composition, filled with 40% by weight of black peat and 28% by weight of anthracite dust A cationic polyurethane(urea) composition produced according to the above production method from 12.3 parts by weight of black peat as in Example 5 (10% by weight of anhydrous black peat), 7 parts by weight of anthracite dust, crushed to a size of less than 90 μm, 8 parts by weight of the cationic NCO prepolymer mixture of Example 5 (4.5% of NCO) and 73 parts by weight of water are reacted and crushed to a granulated material smaller than 12 mm. When suspended in water, the content TS-S is 87 g/l. The apparent densities are as follows:

| | |
|---|---|
| Drained off: | 538 g/l (S1) |
| Crushed out: | 408 g/l (S2) |
| Dried: | 172 g/l (S3). |

EXAMPLE 7

7.1 Carrier material: Cationic polyurethane(urea) composition containing 50% by weight of black peat (dry mass).

A cationic polyurethane composition was prepared from 24.7 parts by weight of black peat as in Example 5 (corresponding to 20 parts by weight of anhydrous black peat), 20 parts by weight of cationic NCO prepolymer KO-PP-C (hydrophobic NCO prepolymer having 5.9% by weight of NCO) and 56.3 parts by weight of water according to the production method above to produce a highly-filled carrier substance which is granulated to a size of less than 12 mm. When suspended in water, the TS-S value is 69.3 g/l. The apparent densities are as follows:

| | |
|---|---|
| Drained off: | 397 g/l (S1) |
| Crushed out: | 377 g/l (S2) |
| Dried: | 140 g/l (S3). |

EXAMPLE 8

Cationic polyurethane urea composition containing 80% by weight of lignite dust (based on dry substance)

45 parts by weight of lignite dust from the Aachen lignite country containing 11% by weight of residual moisture and having a particle size of below 100 μm (corresponding to 40 parts by weight of lignite dry substance), 45 parts by weight of water at 90° C. and 0.05 parts by weight of dibutyl tin dilaurate are continuously introduced into a trough-like heatable, double screw extruder, at the same time with 10 parts by weight of NCO prepolymer KO-PP-C (NCO content 5.9% by weight). The reaction temperature of the mixture is from 60 to 70° C., and the residence time is about 5 minutes. Thereafter, the substantially reacted product which is produced directly in a piece form (pieces below 12 mm in size) is either suspended in water directly or at a later time, and it completely settles immediately in the water. The TS-S value is 185 g/l. The apparent densities are as follows: S1: 483 g/l; S2: 440 g/l; S3: 266 g/l.

TABLE 2

Volume, crush and swelling factors, as well as suspension factors, water absorbability in % and solids content in % of the highly-filled polyurethane(urea) carrier compositions.

| Example | F 1 Volume factor | F 2 Crush factor | F 3 Swelling factor | F 4 Suspension factor | WAF Water absorbability | % FKS Solids content of the suspension | |
|---|---|---|---|---|---|---|---|
| 1 | 3.7 | 3.6 | 3.3 | 7.2 | 86.1 | 13.9 | |
| 2 | 5.8 | 4.5 | 4.4 | 9.1 | 89.0 | 10.9 | |
| 3 | 8.0 | 6.7 | 5.6 | 12.0 | 91.7 | 8.3 | |
| 4 | 14.4 | 13.6 | 13.4 | 28.5 | 96.5 | 3.5 | (Comparative Experiment) |
| 5 | 5.4 | 4.4 | 4.9 | 9.5 | 89.5 | 10.5 | |
| 6 | 6.2 | 4.7 | 6.0 | 11.6 | 91.4 | 8.6 | |
| 7 | 5.4 | 5.4 | 3.8 | 14.5 | 93.1 | 6.9 | |
| 8 | 2.6 | 2.4 | 2.6 | 6.0 | 83.3 | 11.7 | |

The difference of the WAF value (water absorbability) from 100 represents the % solids content (% FKS) in the suspension (without supernatant water).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims:

What is claimed is:

1. A process for the production of polyurethane(urea) compositions comprising reacting:
    (A) at least one di- and/or polyfunctional isocyanate-terminated prepolymer having an isocyanate group content of from 2 to 12% by weight,
    (B) from 0 to 50% by weight, based on the weight of (A) of an organic di- and/or polyisocyanate, with the mixture of (A) and (B) having an isocyanate group content of 30% by weight or less,
    (C) water, with the quantity of water being in excess of that required to react with all the isocyanate groups of (A) and (B),
    (D) from 0 to 50 equivalent percent, based on the total isocyanate equivalents in (A) and (B), of an organic di- and/or polyamine,
    (E) from 0.1 to 95 percent by weight of lignite, the amount of component (E) being based of the total moisture-free weight of components (A), (B), (D) and (E), said polyurethane(urea) composition having a water absorbability of from 33 to 97% by weight.

2. The process of claim 1, wherein said component (A) is prepared by reacting:
    (a) organic materials having two and/or more hydrogen atoms which are reactive with isocyanate groups and having molecular weights of from 400 to 12,000,
    (b) from 0 to about 5 moles per mole of (a) of organic materials having two and/or more hydrogen atoms which are reactive with isocyanate groups and having molecular weights of from 32 to 399, and
    (c) organic di- and/or polyisocyanates.

3. The process of claim 2, wherein said materials (a) are polyhydroxyl compounds.

4. The process of claim 3, wherein said materials (a) have a total hydroxyl functionality of 2.1 or more.

5. The process of claim 2, wherein said materials (b) contain hydroxyl groups.

6. The process of claim 2, wherein components (a) and/or (b) contain cationic groups or groups capable of cationic group formation and can contain anion groups in a quantity up to the amount of cation equivalents.

7. The process of claim 2, wherein said component (A) is prepared by reacting said components (a), (b) and (c) in the presence of polymers which contain cationic groups or groups capable of cationic group formation and which can contain anion groups in a quantity up to the amount of cation equivalents.

8. The process of claim 1, wherein said component (A) has an isocyanate functionality of 2.1 or more.

9. The process of claim 8, wherein said component (A) has an isocyanate group content of from 2.5 to 8% by weight.

10. The process of claim 1, wherein said polyurethane(urea) composition contains from 10 to 3000 milliequivalents of cationic groups or groups capable of cationic group formation per 1000 grams of components (A), (B) and (D).

11. The process of claim 10, wherein the amount of said cationic groups or said groups capable of cationic group formation is from 30 to 1500 milliequivalents per 1000 grams of components (A), (B) and (D).

12. The process of claim 1, wherein component (C) is used in an amount of from 2 to 60 times the weight of components (A) and (B).

13. The process claim 1, wherein component (E) is used in an amount of from 15 to 95 percent by weight.

14. The process of claim 1, wherein said component (A) has an isocyanate group content of from 2.5 to 8% by weight, and is prepared by reacting:

(a) polyfunctional, hydrophilic and/or hydrophobic polyether polyols having a total hydroxyl functionality of 2.1 or more,
(b) from 0 to 2 moles per mole of (a), of low molecular weight di- and/or polyols having a molecular weight of from 62 to 254,
(c) with components (a) and/or (b) containing quaternary ammonium groups or salt-forming tertiary amino groups, and
(d) aromatic diisocyanates.

15. The process of claim 14, characterized in that hydrophobic polyether polyols are used as component (a).

16. The process of claim 1, wherein component (E) is lignite powder is used in quantities of from about 50 to 90% by weight.

17. The process of claim 16, wherein component (D) is used in an amount of from 75 to 90% by weight.

18. The process of claim 1, wherein organic and/or inorganic fillers (F) are added to the reaction mixture.

19. The process of claim 18, wherein said fillers are selected from the group consisting of beach sand, iron-II and/or -III-oxides, magnetite, Aerosil, silica sols and water glass and said fillers ensure that the polyurethane(urea) compositions do not float in aqueous solutions.

20. The process of claim 1, wherein the reaction is conducted in the presence of biomasses.

21. A lignite and/or peat-containing polyurethane(urea) composition having water absorbability of from about 50 to 95% by weight, a lignite- and/or peat content of from 15 to 95% by weight and a content of from 30 to 1,500 milliequivalents per kg of cationic groups or groups capable of cationic group formation.

22. A composition according claim 21, wherein the cationic groups or groups capable of cationic group formation are built into the polyurethane (urea).

23. A process for treating aqueous media by filtration or absorption, characterized in that the compositions according to claim 21 are used as filters or adsorbing means.

24. A process for bioconversion of organic compounds by biomasses into organic compounds characterized in that compositions according claim 21 are used as carriers for biomasses.

25. A process for the production of polyurethane(urea) compositions comprising reacting:
(A) at least one di- and/or polyfunctional isocyanate-terminated prepolymer having an isocyanate group content of from 2 to 12% by weight,
(B) from 0 to 50% by weight, based on the weight of (A) of an organic di- and/or polyisocyanate, with the mixture of (A) and (B) having an isocyanate group content of 30% by weight or less,
(C) water, with the quantity of water being in excess of that required to react with all the isocyanate groups of (A) and (B),
(D) from 0 to 50 equivalent percent, based on the total isocyanate equivalents in (A) and (B), of an organic di- and/or polyamine,
(E) from 0.1 to 95 percent by weight of a member selected from the group consisting of lignite, peat, and mixtures thereof, the amount of component (E) being based on the total moisture-free weight of components (A), (B), (D) and (E), said polyurethane(urea) composition having a water absorbability of from 33 to 97% by weight, wherein said component (A) is prepared by reacting
(a) organic materials having two and/or more hydrogen atoms which are reactive with isocyanate groups and having molecular weights of from 400 to 12,000,
(b) from 0 to about 5 moles per mole of (a) of organic materials having two and/or more hydrogen atoms which are reactive with isocyanate groups and having molecular weights of from 32 to 399, and
(c) organic di- and/or polyisocyanates, and wherein said components (a) and/or (b) contain cationic groups or groups capable of cationic group formation and can contain anion groups in a quantity up to the amount of cation equivalents.

26. A process for the production of polyurethane(urea) compositions comprising reacting:
(A) at least one di- and/or polyfunctional isocyanate-terminated prepolymer having an isocyanate group content of from 2 to 12% by weight,
(B) from 0 to 50% by weight, based on the weight of (A) of an organic di- and/or polyisocyanate, with the mixture of (A) and (B) having an isocyanate group content of 30% by weight or less,
(C) water, with the quantity of water being in excess of that required to react with all the isocyanate groups of (A) and (B),
(D) from 0 to 50 equivalent percent, based on the total isocyanate equivalents in (A) and (B), of an organic di- and/or polyamine,
(E) from 0.1 to 95 percent by weight of a member selected from the group consisting of lignite, peat, and mixtures thereof, the amount of component (E) being based on the total moisture-free weight of components (A), (B), (D) and (E), said polyurethane(urea) composition having a water absorbability of from 33 to 97% by weight, wherein said component (A) is prepared by reacting:
(a) organic materials having two and/or more hydrogen atoms which are reactive with isocyanate groups and having molecular weights of from 400 to 12,000,
(b) from 0 to about 5 moles per mole of (a) of organic materials having two and/or more hydrogen atoms which are reactive with isocyanate groups and having molecular weights of from 32 to 399, and
organic di- and/or polyisocyanates, wherein said component (A) is prepared by reacting said components (a), (b) and (c) in the presence of polymers which contain cationic groups or groups capable of cationic group formation and which can contain anion groups in a quantity up to the amount of cation equivalents.

27. A process for the production of polyurethane(urea) compositions comprising reacting:
(A) at least one di- and/or polyfunctional isocyanate-terminated prepolymer having an isocyanate group content of from 2.5 to 8% by weight,
(B) from 0 to 50% by weight, based on the weight of (A) of an organic di- and/or polyisocyanate, with the mixture of (A) and (B) having an isocyanate group content of 30% by weight or less,
(C) water, with the quantity of water being in excess of that required to react with all the isocyanate groups of (A) and (B), (D) from 0 to 50 equivalent percent, based on the total isocyanate equivalents in (A) and (B), of an organic di- and/or polyamine, (E) from 0.1 to 95 percent by weight of a member selected from the group consisting of lignite, peat, and mixtures thereof, the amount of component (E) being based on the total moisture-free weight of components (A), (B), (D) and (E), said polyurethane(urea) composition having a water absorbability of from 33 to 97% by weight, wherein said component (A) is prepared by reacting:

(a) polyfunctional, hydrophilic and/or hydrophobic polyether polyols having a total hydroxyl functionality of 2.1 or more, (b) from 0 to 2 moles per mole of (a), of low molecular weight di- and/or polyols having a molecular weight of from 62 to 254, (c) with components (a) and/or (b) containing quaternary ammonium groups or salt-forming tertiary amino groups, and (d) aromatic diisocyanates.

28. The process of claim 27 characterized in that hydrophobic polyether polyols are used as component (a).

29. A process for the production of polyurethane(urea) compositions comprising reacting:

(A) at least one di- and/or polyfunctional isocyanate-terminated prepolymer having an isocyanate group content of from 2 to 12% by weight, (B) from 0 to 50% by weight, based on the weight of (A) of an organic di- and/or polyisocyanate, with the mixture of (A) and (B) having an isocyanate group content of 30% by weight or less, (C) water, with the quantity of water being in excess of that required to react with all the isocyanate groups of (A) and (B), (D) from 0 to 50 equivalent percent, based on the total isocyanate equivalents in (A) and (B), of an organic di- and/or polyamine, (E) from 0.1 to 95 percent by weight of a member selected from the group consisting of lignite, peat, and mixtures thereof, the amount of component (E) being based on the total moisture-free weight of components (A), (B), (D) and (E), said polyurethane(urea) composition having a water absorbability of from 33 to 97% by weight, wherein said polyurethane(urea) composition contains from 10 to 3000 milliequivalents of cationic groups or groups capable of cationic group formation per 1000 grams of (A), (B) and (D).

30. The process of claim 29, wherein the amount of said cationic groups or said groups capable of cationic group formation is from 30 to 1500 milliequivalents per 1000 grams of components (A), (B) and (D).

31. A process for the production of polyurethane (urea) compositions comprising reacting:

(A) at least one di- and/or polyfunctional isocyanate-terminated prepolymer having an isocyanate group content of from 2 to 12% by weight, (B) from 0 to 50% by weight, based on the weight of (A) of an organic di- and/or polyisocyanate, with the mixture of (A) and (B) having an isocyanate group content of 30% by weight or less, (C) water, with the quantity of water being in excess of that required to react with all the isocyanate groups of (A) and (B), (D) from 0 to 50 equivalent percent, based on the total isocyanate equivalents in (A) and (B), of an organic di- and/or polyamine, (E) from 0.1 to 95 percent by weight of a member selected from the group consisting of lignite, peat, and mixtures thereof, the amount of component (E) being based on the total moisture-free weight of components (A), (B), (D) and (E), said polyurethane(urea) composition having a water absorbability of from 33 to 97% by weight, wherein said component (A) is prepared by reacting:

(a) hydrophobic organic materials having two and/or more hydrogen atoms which are reactive with isocyanate groups and having molecular weights of from 400 to 12,000, (b) from 0 to 5 moles per mole of (a) of organic materials having two and/or more hydrogen atoms which are reactive with isocyanate groups and having molecular weights of from 32 to 399, and (c) organic di- and/or polyisocyanates.

* * * * *